May 11, 1943.         R. A. KLATT ET AL         2,319,066
              SUPPORTING STAND FOR SCOOTERS
                    Filed April 10, 1941
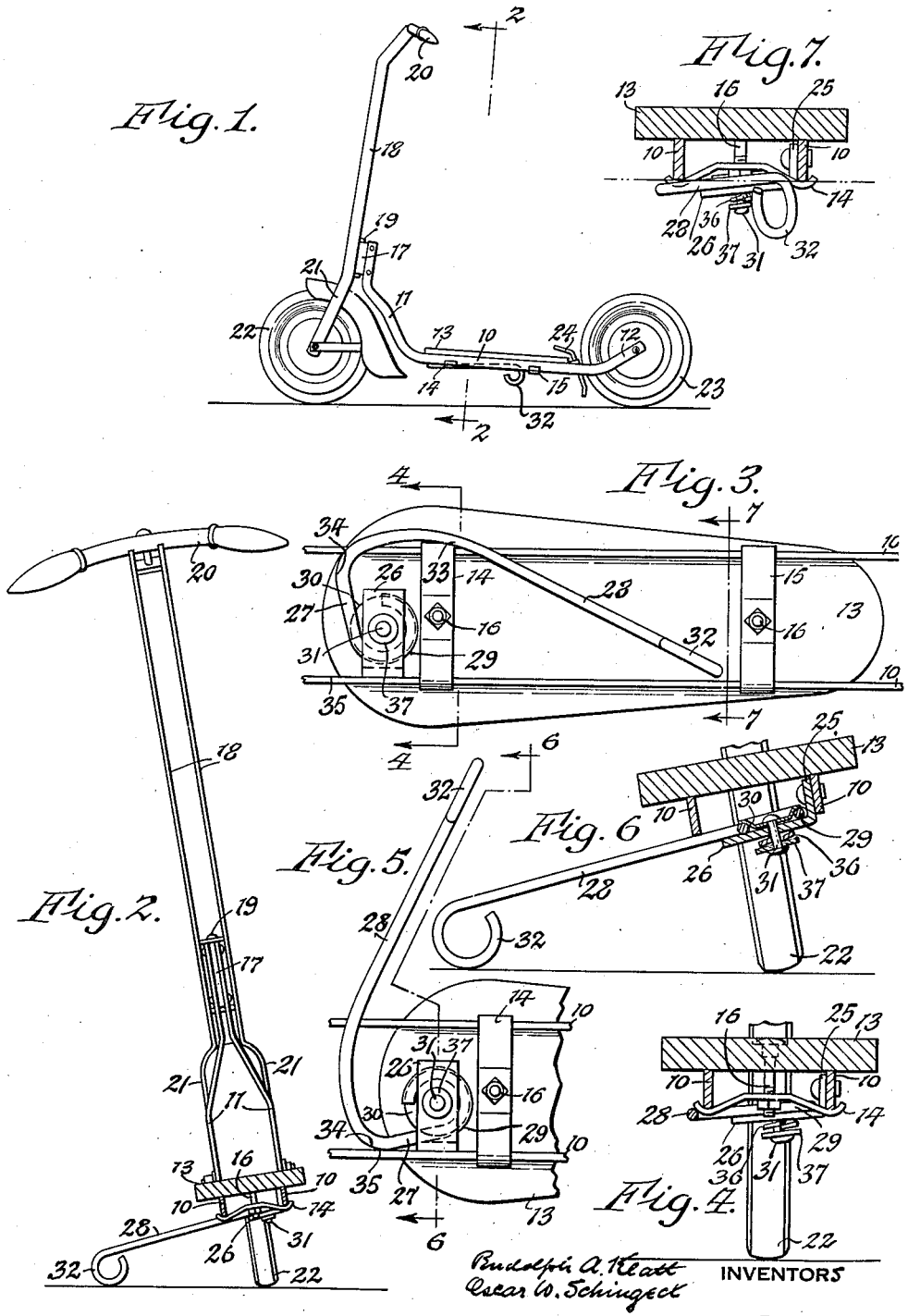

Patented May 11, 1943

2,319,066

UNITED STATES PATENT OFFICE 2,319,066

SUPPORTING STAND FOR SCOOTERS

Rudolph A. Klatt and Oscar W. Schingeck, Tonawanda, N. Y., assignors to Auto Wheel Coaster Company, Inc., North Tonawanda, N. Y., a corporation of New York Application April 10, 1941, Serial No. 387,916

4 Claims. (Cl. 280—301)

This invention relates to a supporting stand or lever whereby scooters when not in use may be held in an upright position on the ground or floor upon which the scooter rests.

It is the object of this invention to provide a stand for this purpose which is very simple and inexpensive in construction, which can be easily moved into and out of its operative position, and which is strong and durable and supports the scooter reliably in an upright position when in use.

In the accompanying drawing:

Fig. 1 is a side elevation, on a reduced scale, of a scooter embodying my improvements and showing the stand in its inoperative position.

Fig. 2 is a vertical transverse section, on an enlarged scale taken on line 2—2, Fig. 1, but showing the stand in an operative position.

Fig. 3 is a fragmentary bottom plan view of the body of the scooter, on an enlarged scale, and the stand thereon in its inoperative position.

Fig. 4 is a vertical transverse section taken on line 4—4, Fig. 3.

Fig. 5 is a fragmentary bottom plan view of the body of the scooter and the stand thereon in its operative position.

Fig. 6 is a vertical transverse section taken on line 6—6, Fig. 5.

Fig. 7 is a cross section taken on line 7—7, Fig. 3.

In the following description similar characters of reference indicate like parts in the several figures of the drawing.

The body of this scooter comprises two frame bars having horizontal central main parts 10 arranged lengthwise and spaced transversely, upwardly turned parts 11 at the front end of the central parts and upwardly turned parts 12 at the rear ends of the central parts. Upon the central parts of the frame bars a foot board or platform 13 is secured by fastening means which preferably consist of two clips 14, 15 arranged transversely underneath the front and rear parts of the horizontal parts of the frame bars and each engaging its ends with the underside of the adjacent parts of the frame bars and a clamping bolt 16 which connects the central parts of each clip with the adjacent part of the foot board, thereby holding the platform and frame bars in position relative to each other.

Upon the upper ends of the front parts 11 of the frame bars is mounted a steering head 17 and on the latter is pivoted the central part of a steering post which preferably includes two upright post bars 18 to the upper ends of which a transverse handle bar 20 is secured. The lower ends of the steering post bars are spread to form a fork 21 upon which the front or steering wheel 22 is pivoted in any suitable manner. Between the rear ends of the frame bars is arranged the rear or trailing wheel 23 which is pivoted to the same in a well known manner. Upon the rear end of the platform or foot board is mounted a brake 24 which may be engaged by foot pressure with the rear wheel for controlling rotation of the same.

The improved supporting means whereby the scooter is held in an upright position when not in use is constructed as follows:

Between the central parts of the frame bars adjacent to the front end of the foot board or platform is arranged a supporting bracket which preferably has the form of an angle iron, one member 25 of which is upright and secured to the inner side of the central part of one of the frame bars while the other member 26 of this angle iron projects from the lower end of the member 25 inwardly to the adjacent parts of the other frame part. Below the foot board and a part of the frame is arranged a stand arm which is preferably substantially of L-shape to provide a comparatively short inner member 27 and a comparatively long outer member 28. The inner end of the inner arm member 27 is provided with a pivot eye 29 which rests on the upper side of the horizontal member 26 of the supporting bracket and is pivotally connected therewith by a dished washer or disk 30 engaging with the upper side of the eye 29 and secured to the upper side of the bracket member 26 by a rivet 31, as shown in Figs. 3, 5 and 6. The stand arm projects from its pivot adjacent to one frame bar transversely underneath the adjacent part of the other frame bar and is provided at its outer end with a vertical bearing loop 32.

When the supporting stand arm is not in use while operating the scooter the same is turned into the position shown in Figs. 1, 3 and 4 in which the inner member 27 thereof extends crosswise of the frame and the outer member 28 extends lengthwise of the frame and is arranged below the platform or foot board and terminates between the horizontal section 10 of the frame bars. The movement of the supporting stand arm in this direction is limited by the stop 33 which is formed by the adjacent end of the clip 14 and thereby enables the stand to be folded into this idle position by a kick of the foot without liability of the stand arm being shifted inwardly too far and projecting with its free end beyond the side of the foot board and possibly interfere with the use of the scooter.

In order to fold the free end of the supporting stand arm as closely as possible to the underside of the foot board the lower member 26 of the supporting bracket and the pivot pin or rivet 31 are inclined inwardly as shown in Figs. 2, 4 and 6 so that when the supporting stand has its outer end represented by the bearing loop 32 in its projected or operative position this loop will be arranged below the plane of the lower sides of the horizontal frame bar sections 10, as shown in Fig. 6, but when the stand arm is folded into a position under the foot board its outer end is arranged between the frame bar sections 10 and partly above the plane of the underside of this section, shown in Fig. 7, thereby rendering the parts more compact at this time.

When the scooter is not in use and it is desired to support the same in an upright position, the supporting stand arm is turned from the folded position outwardly so that its inner short member 27 is arranged lengthwise of the foot board and frame and the long outer member 28 of this arm projects laterally from the frame and foot board, thereby permitting the bearing loop 32 to be engaged with the ground or floor and support the scooter in an upright but laterally inclined position, as shown in Fig. 2. The outward or unfolding movement of the stand arm is preferably limited by employing the elbow 34 at the junction of the outer and inner members 28, 27 of the stand arm as a stop which engages with the adjacent stop surface 35 on the frame bar which carries the bracket 25, 26 and thus arrests the stand arm when drawn outwardly in the correct position for best supporting the scooter without requiring special care for this purpose.

When the stand arm has been moved into its outer operative position its inner end is secured to the frame by the rivet or pivot pin 31, its outer end is supported on the ground or floor by the bearing loop 32 and its intermediate part engages with the underside of the frame bar opposite to the bracket 25, 26, thereby forming a three point bearing for the stand arm and producing a substantial leverage which operates to reliably support the scooter in a substantially upright position without liability of the same tipping over sidewise notwithstanding that the handle bar and steering post may considerably overhang the center of gravity.

In the preferred construction the lower end of the pivot pin 31 passes through a spring washer 36 which is interposed between the underside of the bracket arm 26 and a plain washer 37 on the lower end of the pivot pin 31 and operates to force the dished or cup shaped washer into the eye 29 of the stand arm and thus produce sufficient friction to prevent the stand arm from accidentally swinging outwardly into an operative position.

As a whole this stand for supporting the scooter when not in use is very light, it has few parts which are not liable to get out of order and the same can be produced at low cost.

We claim as our invention:

1. A supporting stand for a scooter having two longitudinal frame bars, said stand comprising a stand arm pivoted on one of said bars to turn about a vertical axis into a position in which the outer end of this arm is arranged between said bars or into a position in which the outer end of said arm is capable of resting on the ground and its intermediate part engages the underside of the other frame bar.

2. A supporting stand for a scooter having two longitudinal frame bars, said stand including a stand arm which is pivoted at its inner end on one of said bars and adapted to be turned into an inoperative position in which its outer end is arranged between said bars and also into an operative position in which the outer end of the same projects laterally from the frame bars and is capable of resting on the ground while the intermediate part of said arm engages with the other frame bar, and said arm being L-shaped to form a short inner member which is adapted to extend lengthwise of the frame bars and to engage with the inner side of the respective frame bar on which the stand arm is mounted when the latter is in its operative position.

3. A supporting stand for a scooter having two longitudinal frame bars, said stand including a bracket secured to the inner side of one of said bars, and a stand arm having an eye at its inner end which is pivoted on said bracket and adapted when moved into its operative position to project laterally with its outer part and engage the underside of the other frame bar and bear with its outer end against the ground.

4. A supporting stand for a scooter having two longitudinal frame bars, said stand including a bracket secured to the inner side of one of said bars, a stand arm having an eye at its inner end which is pivoted on said bracket and adapted when moved into its operative position to project laterally with its outer part and engage the underside of the other frame bar and bear with its outer end against the ground, and a clip which engages the underside of said bars and which forms a stop adapted to be engaged by the stand arm upon moving the same into its inoperative position.

RUDOLPH A. KLATT.
OSCAR W. SCHINGECK.